United States Patent
Chandra et al.

(10) Patent No.: US 7,657,773 B1
(45) Date of Patent: Feb. 2, 2010

(54) CLOCK DISTRIBUTION CHIP FOR GENERATING BOTH ZERO-DELAY AND NON-ZERO-DELAY CLOCK SIGNALS

(75) Inventors: Shyam Chandra, Portland, OR (US); Om Agrawal, Los Altos, CA (US); Ludmil Nikolov, Chippenham (GB); Harald Weller, Romsey (GB); Douglas Morse, Bath (GB)

(73) Assignee: Lattice Semiconductor Corporation, Hillsboro, OR (US)

( * ) Notice: Subject to any disclaimer, the term of this patent is extended or adjusted under 35 U.S.C. 154(b) by 442 days.

(21) Appl. No.: 11/425,881

(22) Filed: Jun. 22, 2006

(51) Int. Cl.
G06F 1/00 (2006.01)
G06F 1/04 (2006.01)
(52) U.S. Cl. .................... 713/500; 713/600; 327/295
(58) Field of Classification Search ............... 713/400, 713/401, 500, 600; 327/154, 156, 295
See application file for complete search history.

(56) References Cited

U.S. PATENT DOCUMENTS

| | | | |
|---|---|---|---|
| 6,515,530 B1 * | 2/2003 | Boerstler et al. ............ 327/291 |
| 6,528,974 B1 * | 3/2003 | Mirov et al. ................ 323/267 |
| 6,621,496 B1 * | 9/2003 | Ryan ......................... 345/533 |
| 6,651,181 B1 * | 11/2003 | Lacey ........................ 713/503 |
| 6,654,898 B1 * | 11/2003 | Bailey et al. ................ 713/500 |
| 6,779,125 B1 * | 8/2004 | Haban ........................ 713/500 |
| 6,836,169 B2 * | 12/2004 | Richmond et al. .......... 327/291 |
| 6,885,227 B2 | 4/2005 | Agrawal et al. |
| 6,889,334 B1 * | 5/2005 | Magro et al. ................ 713/500 |

OTHER PUBLICATIONS

Sekar Deepak C, Clock trees: differential or single ended?, 2005, Proceedings of the Sixth International Symposium on Quality Electronic Design.*
Fairchild Semiconductor, FMS7951 Zero Delay Clock Multiplier, Jan. 9, 2001, Rev. 1.0.0.*
IspClock 5600 Family "In-System Programmable, Zero-Delay Clock Generator with Universal Fan-Out Buffer," Lattice Semiconductor Corporation Web Site, Feb. 2005, Data Sheet, pp. 1-49.
IspClock5600A Family "In-System Programmable Enhanced Zero-Delay Clock Generator with Universal Fan-Out Buffer," Lattice Semiconductor Corporation Web Site, Dec. 2005, Preliminary Data Sheet, pp. 1-48.
RoboClock CY7B994V CY7B993V "High-speed Multi-phase PLL Clock Buffer," Cypress Semiconductor Corporation, San Jose, CA, Document E38-07127, Jul. 25, 2003, pp. 1-14.
IDT5T9891 Advance Information "EEPROM Programmable 2.5V Programmable Skew PLL Differential Clock Driver," Integrated Device Technology, Jun. 2004, pp. 1-36.
IDT5T9890 Advance Information "EEPROM Programmable 2.5V Programmable Skew PLL Clock Driver," Integrated Device Technology, Jun. 2004, pp. 1-36.

* cited by examiner

*Primary Examiner*—Mark Connolly
(74) *Attorney, Agent, or Firm*—Mendelsohn, Drucker & Associates, P.C.

(57) ABSTRACT

In one embodiment of the invention, a clock distribution (CD) chip has one or more input pins, input buffer circuitry, clock generation and distribution circuitry, fanout circuitry, one or more output pins, a feedback pin, and feedback buffer circuitry. Based on single-ended or differential input clock signals applied to the input pins, the CD chip can be programmably configured to generate zero, one, or more zero-delay (ZD) output clock signals and zero, one, or more non-zero-delay (NZD) output clock signals for simultaneous presentation at the output pins.

21 Claims, 2 Drawing Sheets

CLOCK DISTRIBUTION CHIP FOR GENERATING BOTH ZERO-DELAY AND NON-ZERO-DELAY CLOCK SIGNALS

TECHNICAL FIELD

The present invention relates to integrated circuits, and, in particular, to clock distribution chips designed to distribute clock signals to devices on a circuit board.

BACKGROUND

A clock distribution chip (also referred to as a clock chip) is an integrated circuit (IC) designed to distribute clock signals to other electronic devices, such as other devices located on the same printed circuit board (PCB) as the clock distribution chip. Traditionally, there have been two different types of clock distribution chips: (1) zero-delay buffers and (2) non-zero-delay buffers (also referred to as simple clock buffers or drivers).

A zero-delay buffer receives an input (i.e., reference) clock signal and generates multiple output clock signals having specified (e.g., zero) phase offsets relative to the input clock signal. Zero-delay buffers typically employ phase-locked loops (PLLs) to generate the output clock signals, where the frequency of each output clock signal may differ from (e.g., may be greater or smaller than) the frequency of the reference clock signal. Some PLL-based zero-delay buffers offer skew control to select desired, non-zero phase offsets for one or more of the output clock signals relative to the reference clock signal.

Non-zero-delay buffers provide multiple copies of an input clock signal without ensuring that the generated output clock signals have any predictable phase offsets relative to the input clock signal. Non-zero-delay buffers are typically non-PLL-based circuits.

In order for different devices, e.g., located on a single PCB, to be able to communicate, each transmitting device must transmit signals that each corresponding receiving device will recognize. Signaling standards have been promulgated to specify the characteristics of signals to enable such inter-device communications. Some signaling standards, such as LVPECL and LVDS, involve differential clock signals, while other signaling standards, such as LVTTL, LVCMOS, HSTL, and SSTL, involve single-ended (SE) clock signals. In addition, different signaling standards involve different voltage amplitudes, including some individual signaling standards having different versions at different voltage amplitudes. For example, there are three different types of LVCMOS signaling that are based on 1.8V, 2.5V, and 3.3V amplitudes, respectively.

Conventional zero-delay buffers and conventional non-zero-delay buffers come in particular models, each of which receives a limited variety of input clock signals and generates a limited variety of output clock signals (e.g., different models for different voltage amplitudes). For many applications, PCBs have different devices that require different clock signals, e.g., conforming to different signaling standards, for their processing, where some devices may require zero-delay clock signals, while other devices might not be able to tolerate the jitter typically inherent in PLL-generated zero-delay clock signals. As a result, a PCB for such an application is typically configured with a relatively large number of different models of clock distribution chips in order to support the variety of different signaling standards required by the devices on that PCB, resulting in possible wastage of resources.

SUMMARY

In one embodiment, the present invention is a clock distribution (CD) chip comprising first and second input pins, input buffer circuitry, clock generation and distribution circuitry, fanout circuitry, a plurality of output pins, a feedback pin, and feedback buffer circuitry. The first and second input pins receive first and second input clock signals corresponding to either a differential input clock signal or two single-ended (SE) input clock signals. The input buffer circuitry receives and handles the input clock signals from the input pins. The clock generation and distribution circuitry receives a reference clock signal and one or more other clock signals from the input buffer circuitry and programmably generates (i) any of zero, one, or more zero-delay (ZD) clock signals based on the reference clock signal and (ii) any of zero, one, or more non-zero-delay (NZD) clock signals based on the one or more other clock signals. The fanout circuitry generates an output clock signal for each of the ZD and NZD clock signals. The plurality of output pins presents the output clock signals. The feedback pin receives one of the output clock signals presented at one of the output pins. The feedback buffer circuitry derives a feedback clock signal from the output clock signal presented at the feedback pin and provides the feedback clock signal to the clock generation and distribution circuitry for use in generating each ZD clock signal.

In another embodiment, the present invention is CD chip comprising a first input pin, circuitry, and two output pins. The first input pin receives a first input clock signal. The circuitry simultaneously generates (1) a ZD output clock signal based on the first input clock signal and (2) an NZD output clock signal based on the first input clock signal. The two output pins simultaneously present the ZD output clock signal and the NZD output clock signal.

In yet another embodiment, the present invention is a CD chip comprising first and second input pins, input buffer circuitry, clock generation, distribution, and fanout circuitry, an output pin, a feedback pin, and feedback buffer circuitry. The first and second input pins receive first and second input clock signals corresponding to a differential input clock signal. The input buffer circuitry converts the differential input clock signal into a reference clock signal. The clock generation, distribution, and fanout circuitry generates an SE ZD output clock signal based on the reference clock signal. The output pin presents the SE ZD output clock signal. The feedback pin receives the SE ZD output clock signal from the output pin. The feedback buffer circuitry converts the SE ZD output clock signal received at the feedback pin into a feedback clock signal corresponding to a simulated differential feedback clock signal, wherein the feedback clock signal is applied to the clock generation, distribution, and fanout circuitry for use in generating the SE ZD output clock signal.

In still another embodiment, the present invention is a CD chip comprising a first input pin, circuitry, and at least one output pin. The first input pin receives a first input clock signal. The circuitry generates at least one output clock signal based on the first input clock signal. The at least one output pin presents the at least one output clock signal, wherein the circuitry is programmably configured to generate the at least one output clock signal as any of a ZD output clock signal and an NZD output clock signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Chip-Level Description

Figure 1:
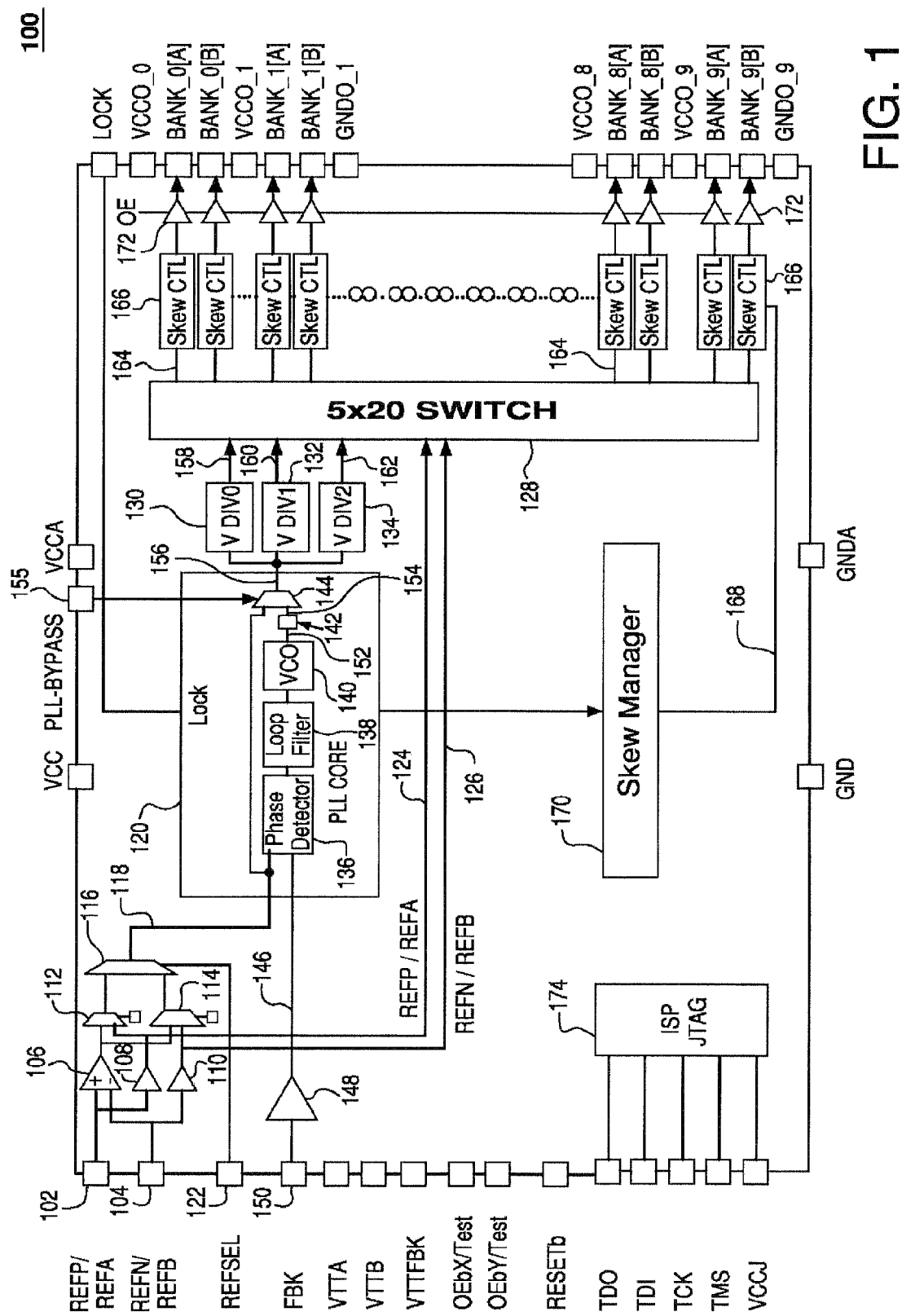
FIG. 1 shows a simplified block diagram of a clock distribution (CD) chip according to one embodiment of the present invention.

FIG. 1 shows a simplified block diagram of a clock distribution (CD) chip 100, according to one embodiment of the present invention. Depending on its configuration, CD chip 100 receives either (1) one or two single-ended (SE) input clock signals (REFA and/or REFB) at input pins 102 and/or 104, respectively, or (2) the two halves (REFP and REFN) of a differential input clock signal at input pins 102 and 104, respectively, and generates up to 20 different SE output clock signals BANK_i[A/B] presented at 20 different output pins on CD chip 100.

In CD chip 100, the output pins are arranged in 10 different banks (BANK_0 to BANK_9), where each bank (i.e., BANK_i) has four pins: two output-clock pins (corresponding to output clock signals BANK_i[A] and BANK_i[B]), a power-level pin (corresponding to output power level VCCO_i), and a ground-level pin (corresponding to output ground level GNDO_i), where VCCO_i and GNDO_i specify the voltage amplitude and ground levels, respectively, for the two corresponding output clock signals.

CD chip 100 can be configured to receive a relatively wide variety of different input clock signals and generate a relatively wide variety of different output clock signals. Table I shows the different types of input clock signals supported by CD chip 100, while Table II shows the different types of output clock signals supported by CD chip 100. Note that, for SE input clock signals, REFA and REFB can correspond to any combination of two SE signaling standards listed in Table I.

TABLE I

INPUT CLOCK SIGNALS

| Standard | Voltage Amplitude |
| --- | --- |
| LVTTL | 3.3 V |
| LVCMOS-3.3 | 3.3 V |
| LVCMOS-2.5 | 2.5 V |
| HSTL | 1.5 V or 1.8 V |
| SSTL2 | 2.5 V |
| SSTL3 | 3.3 V |
| LVPECL | 3.3 V |
| LVDS | 2.5 V or 3.3 V |

TABLE II

OUTPUT/FEEDBACK CLOCK SIGNALS

| Standard | Voltage Amplitude (VCCO) |
| --- | --- |
| LVTTL | 3.3 V |
| LVCMOS-3.3 | 3.3 V |
| LVCMOS-2.5 | 2.5 V |
| HSTL | 1.5 V or 1.8 V |
| SSTL2 | 2.5 V |
| SSTL3 | 3.3 V |

Figure 2:
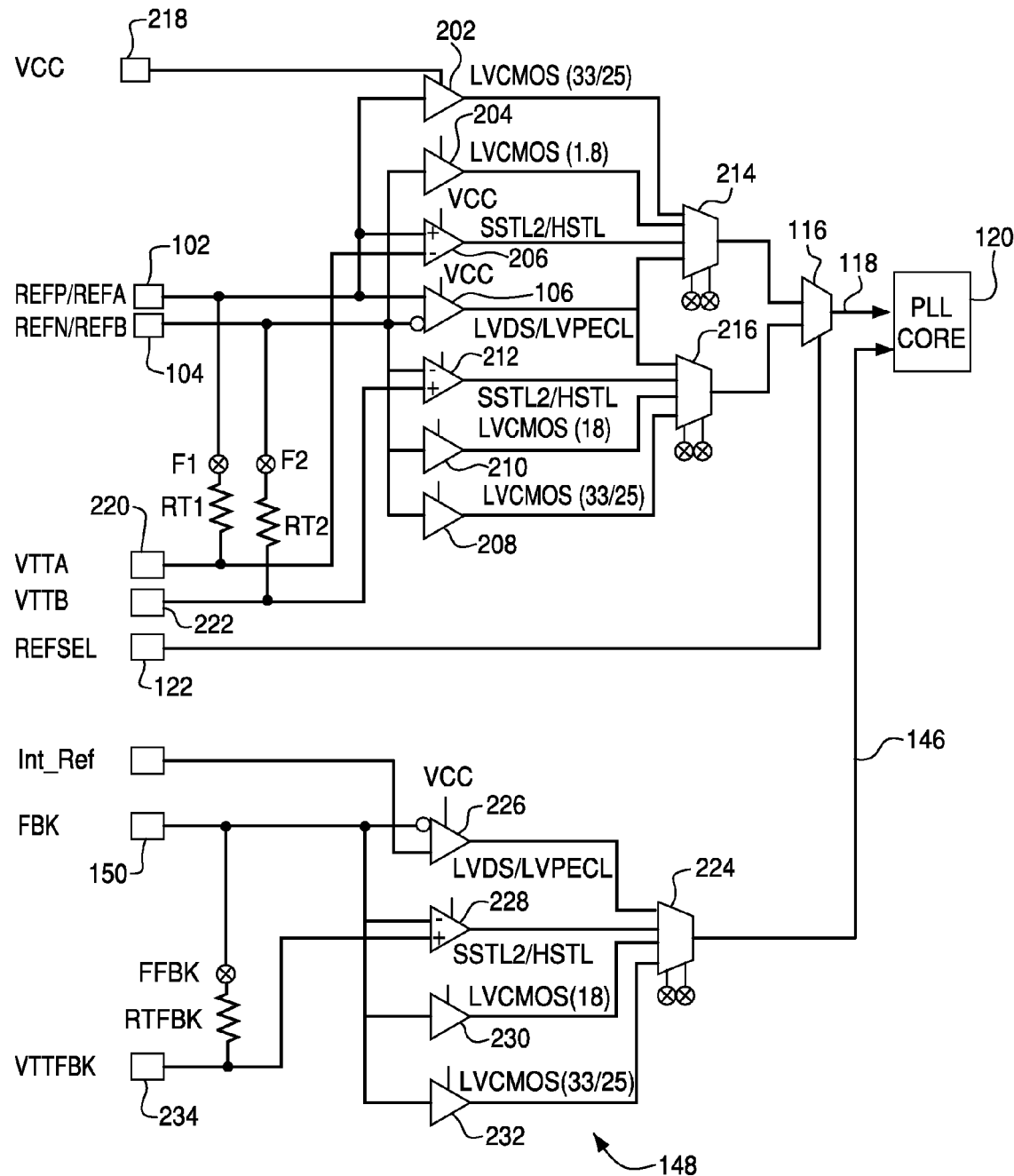
FIG. 2 shows a more detailed block diagram of the input buffer circuitry of the CD chip of FIG. 1.

The upper left-hand corner of FIG. 1 shows a simplified version of the input buffer circuitry used to process the signals received at pins 102 and 104. FIG. 2, which is described later in this specification, provides a more complete diagram of this input buffer circuitry. Nevertheless, the circuitry shown in FIG. 1 accurately represents at least some of the functionality provided by CD chip 100. In particular, FIG. 1 shows a differential input buffer (e.g., op-amp) 106, two SE input buffers 108 and 110, and three (2×1) muxes 112, 114, and 116.

Differential input buffer 106 receives the two signals applied to pins 102 and 104 (to handle differential input clock signals REFP and REFN), while SE input buffers 108 and 110 receive the two signals applied to pins 102 and 104, respectively (to handle SE input clock signals REFA and REFB, respectively). The outputs from input buffers 106 and 108 are applied to the two inputs of mux 112, while the outputs from input buffers 106 and 110 are applied to the two inputs of mux 114. The outputs from muxes 112 and 114 are applied to the two inputs of mux 116.

If CD chip 100 is configured to receive a differential input clock signal REFP/REFN, then at least one, if not both, of muxes 112 and 114 are controlled to select the output from differential input buffer 106, and mux 116 is controlled to apply that same clock signal as reference clock signal 118 to PLL core 120.

If CD chip 100 is configured to receive one or two SE input clock signals REFA and/or REFB, then muxes 112 and/or 114 are correspondingly controlled to select the outputs from SE input buffers 108 and 110, respectively, and mux 116 is controlled to select one of the outputs from muxes 112 and 114 to apply to PLL core 120 as reference clock signal 118.

As shown in FIG. 1, the selection made by mux 116 is based on an externally generated control signal REFSEL applied to pin 122.

As also shown in FIG. 1, in addition to being applied to muxes 112 and 114, the outputs from buffers 108 and 110 are also applied as clock signals 124 and 126 directly to (5×20) switch fabric 128, thereby bypassing PLL core 120 and dividers 130, 132, and 134. In an alternative embodiment, the outputs from muxes 112 and 114 could instead be applied as clock signals 124 and 126, respectively.

PLL core 120 comprises phase detector (PD) 136, loop filter 138, voltage-controlled oscillator (VCO) 140, clock divider 142, and (2×1) mux 144. PD 136 receives reference clock signal 118 from mux 116 as the PLL reference clock signal and feedback clock signal 146 from feedback buffer circuitry 148 as the PLL feedback clock signal. Feedback buffer circuitry 148 receives clock signal FBK applied to pin 150. In a preferred configuration, pin 150 is externally connected to receive one of the output clock signals BANK_i[A/B] generated by CD chip 100.

The output from PD 136 is filtered by loop filter 138, and the resulting voltage is applied to VCO 140, which generates a corresponding VCO clock signal 152. Clock divider 142 divides VCO clock signal 152 by a divisor value of 2 and applies the resulting divided VCO clock signal 154 to one input of mux 144, which also receives a copy of reference clock signal 118 from mux 116 as its other input. Based on an externally generated control signal PLL-BYPASS applied to pin 155, mux 144 selects either reference clock signal 118 (thereby bypassing the PLL) or the PLL-based divided VCO clock signal 154 as output clock signal 156 from PLL core 120.

In either case, PLL core output clock signal 156 is applied in parallel to three different clock dividers 130, 132, and 134, each of which divides the PLL core output clock signal by a specified (and potentially different) divisor value to generate a corresponding divider output clock signal (158, 160, 162).

In one implementation, each clock divider is a 5-bit divider capable of dividing the received clock signal by any integer divisor value from 1 to 32.

(5×20) switch fabric 128 (a) receives up to five different clock signals: (i) clock signals 158, 160, and 162 from clock dividers 130, 132, and 134 and (ii) clock signals 124 and 126 from the input buffer circuitry and (b) outputs up to 20 different output clock signals, in a fully non-blocking manner, such that each received clock signal can be routed to any one or more different clock signals 164.

Each clock signal 164 from switch fabric 128 is applied to a different skew controller 166, which adds a specified phase delay to the corresponding clock signal 164 based on a skew control signal 168 received from skew manager 170. In one implementation of CD chip 100, skew control is applied only to those clocks 164 derived from the PLL's VCO clock signal 152. In this implementation, each skew controller 166 has a (2×1) output mux (not shown) that receives both the non-skewed clock signal 164 received from switch fabric 128 and the skewed clock signal, where the mux output signal is selected based on whether or not the clock signal received from switch fabric 128 was derived from the PLL's VCO clock signal.

Skew control signals 168 generated by skew manager 170 instruct the relevant skew controllers 166 to add a phase delay corresponding to anywhere from 0 to 15 skew steps, where skew manager 170 determines the skew step size based on the PLL's VCO clock signal. In one implementation, skew manager 170 can be configured to operate in either a fine skew mode (where the skew step size is based on the VCO clock signal divided by 8) or a coarse skew mode (where the skew step size is based on the VCO clock signal divided by 4). In one implementation, each different skew controller 166 receives its own skew control signal 168 from skew manager 170. As such, different skew controllers 166 can be instructed to apply different amounts of skew to their respective clock signals.

The output of each skew controller 166 is applied to a programmable output drive buffer 172, which can selectively control the slew rate of the resulting output clock signal BANK_i[A/B]. Although not shown in FIG. 1, programmable on-chip termination circuitry is also provided to enable each output clock signal BANK_i[A/B] to have a variety of different termination levels corresponding to the different signaling standards specified in Table II.

As shown in FIG. 1, CD chip 100 has in-system programmable (ISP) Joint Test Action Group JTAG interface 174, which allows CD chip 100 to be programmed using a serial protocol and allows access to every pin of CD chip 100 to verify proper connectivity with the circuit board.

CD chip 100 may be said to include:
Input buffer circuitry comprising differential input buffer 106, first-input input buffer 108, second-input input buffer 110, and muxes 112-116;
Clock generation and distribution circuitry comprising PLL core 120, clock dividers 130-134, and switch fabric 128;
Fanout circuitry comprising skew controllers 166 and output drive buffers 172; and
Feedback buffer circuitry 148.

Input Circuitry

FIG. 2 shows a more detailed block diagram of the input buffer circuitry of CD chip 100 of FIG. 1. Comparing FIG. 1 and FIG. 2, SE input buffer 108 of FIG. 1 is actually implemented using three different input buffers: SE buffer 202 (suitable for 3.3V LVTTL, 3.3V/2.5V LVCMOS, and 3.3V SSTL3 signaling), SE buffer 204 (suitable for 1.8V LVCMOS signaling), and SE buffer 206 (suitable for 2.5V SSTL2 and 1.5V/1.8V HSTL signaling). Similarly, SE input buffer 110 of FIG. 1 is actually implemented using three different input buffers: SE buffer 208 (suitable for 3.3V LVTTL, 3.3V/2.5V LVCMOS, and 3.3V SSTL3 signaling), SE buffer 210 (suitable for 1.8V LVCMOS signaling), and SE buffer 212 (suitable for 2.5V SSTL2 and 1.5V/1.8V HSTL signaling). Note that differential input buffer 106 is suitable for 2.5V/3.3V LVDS and 3.3V LVPECL signaling.

Furthermore, (2×1) muxes 112 and 114 of FIG. 1 are actually implemented using (4×1) muxes 214 and 216, respectively, where each (4×1) mux is controlled via a configurable 2-bit control signal.

Power (VCC) for input buffers 106 and 202-212 is applied at input pin 218. All of the input signaling standards of Table I can be supported by a VCC level of 3V.

Input termination level VTTA for input pin 102 is applied via input pin 220, programmable resistor RT1, and switch F1. If SE input clock signal REFA conforms to an LVTTL or LVCMOS standard, then switch F1 should be open. If SE input clock signal REFA conforms to an HSTL or SSTL standard, then switch F1 should be closed.

Similarly, input termination level VTTB for input pin 104 is applied via input pin 222, programmable resistor RT2, and switch F2. If SE input clock signal REFB conforms to an LVTTL or LVCMOS standard, then switch F2 should be open. If SE input clock signal REFB conforms to an HSTL or SSTL standard, then switch F2 should be closed.

If differential input clock signal REFP/REFN conforms to an LVDS or LVPECL standard, then (i) switches F1 and F2 should both be closed, (ii) resistors R1 and R2 should both be set to 50 ohms, and (iii) input pins 220 and 222 should be connected together, either shorted or via some appropriate external impedance.

Feedback Circuitry

FIG. 2 also shows a more detailed block diagram of feedback buffer circuitry 148 of FIG. 1. As shown in FIG. 2, feedback buffer circuitry 148 is actually implemented using a (4×1) mux 224 and four input buffers: differential buffer 226 (suitable for 2.5V/3.3V LVDS and 3.3V LVPECL signaling), SE buffer 228 (suitable for 2.5V SSTL2 and 1.5V/1.8V HSTL signaling), SE buffer 230 (suitable for 1.8V LVCMOS signaling), and SE buffer 232 (suitable for 3.3V LVTTL, 3.3V/2.5V LVCMOS, and 3.3V SSTL3 signaling), each of whose outputs is applied to a different input of mux 224, which is controlled by a configurable 2-bit control signal. The output of mux 224 of FIG. 2 is equivalent to the output of feedback buffer circuitry 148 of FIG. 1, and is appropriately shown being applied to the feedback port of PLL core 120 as feedback clock signal 146.

Power signal VCC applied at input pin 218 is also used to power input buffers 226-232.

Feedback termination level VTTFBK for input pin 150 is applied via input pin 234, programmable resistor RTFBK, and switch FFBK. If SE feedback clock signal FBK conforms to an LVTTL or LVCMOS standard, then switch FFBK should be open. If SE feedback clock signal FBK conforms to an HSTL or SSTL standard, then switch FFBK should be closed.

As shown in FIG. 2, internal reference voltage level Int_Ref, which is generated internal to CD chip 100 based on VCC, is used to simulate differential signaling at differential buffer 226. This simulated differential signaling is preferably employed when the PLL reference clock signal output from mux 116 is based on a differential input clock signal REFP/

REFN, so that the PLL feedback clock signal output from mux 224 will be based on a simulated differential clock signal derived from the single-ended output clock signals BANK_i[A/B] generated by CD chip 100 applied to pin 150.

The feedback buffer circuitry shown in FIG. 2 supports feedback clock signals 146 having the same relatively wide variety of different signaling standards shown in Table II for the output clock signals. This means than any one of output clock signals BANK_i[A/B] can be externally connected for application as feedback clock signal FBK at input pin 150.

Different Combinations of Signaling Standards

CD chip 100 can be configured to receive a relatively wide variety of different input clock signals and to generate a relatively wide variety of different output clock signals. In particular, CD chip 100 can be configured such that (1) SE input clock signals REFA and REFB conform to any combination of the SE signaling standards shown in Table I or (2) differential input clock signal REFP/REFN conforms to any of the differential signaling standards shown in Table I.

At the same time, and independent of the signaling standards of the input clock signals, the output clock signals BANK_i[A/B] generated by CD chip 100 can correspond to any combination of the SE signaling standards shown in Table II, with the sole constraint being that the two output clock signals for each bank (BANK_i[A] and BANK_i[B]) share the same VCCO and GNDO levels. Thus, for example, if VCCO for BANK_0 is 3.3V, then the two corresponding output clock signals (BANK_0[A] and BANK_0[B]) can conform to any combination of the 3.3V LVTTL, 3.3V LVCMOS, and 3.3V SSTL signaling standards, including both output clock signals conforming to the same signaling standard.

The feedback clock signal FBK applied to input pin 150 can be selected to be any one of the output clock signals BANK_i[A/B] independent of the signaling standard of the signals applied to input pins 102 and 104. In practice, however, when CD chip 100 is configured to receive SE input clock signals REFA and REFB, in order to reduce static phase offset, the output clock signal selected for feedback clock signal FBK typically conforms to the same signaling standard as one of input clock signals REFA and REFB. Moreover, in order for the PLL to operate properly, the output clock signal selected for feedback clock signal FBK should be a zero-delay output clock signal (if any) derived from the PLL's VCO clock signal.

Zero-Delay and Non-Zero-Delay Output Clocks

In addition to supporting different signaling standards, including simultaneous support of two or more different signaling standards, CD chip 100 of FIG. 1 can simultaneously generate zero, one, or more zero-delay (ZD) output clock signals and zero, one, or more non-zero-delay (NZD) output clock signals.

Each ZD output clock signal is based on the PLL's VCO clock signal 152, which itself is based on reference clock signal 118 from mux 116, which in turn may be based on any of differential input clock signal REFP/REFN, SE input clock signal REFA, or SE input clock signal REFB.

Similarly, each NZD output clock signal is based on clock signals that bypass the PLL. For example, one or more NZD output clock signals may be based on reference clock signal 118 bypassing the PLL via mux 144. At the same time, one or more other NZD output clock signals may be based on clock signal 124, while one or more further NZD output clock signals may be based on clock signal 126. Note that each of clock signals 124 and 126 may be based on either input clock signal REFP/REFA or input clock signal REFN/REFB.

Note further that, if mux 144 is configured to select divided PLL clock signal 154, then any NZD output clock signals can be based only on clock signals 124 and 126.

Alternatives

Although the present invention has been described in the context of CD chip 100 of FIGS. 1 and 2, the present invention is not limited to this particular embodiment. In general, clock distribution chips of the present invention may:

Support combinations of signaling standards other than those listed in Tables I and II;

Include different numbers of divider circuits other than the three divider circuits 130, 132, and 134;

Include switch fabrics different from (5×20) non-blocking switch fabric 128, having different numbers of input ports and/or different numbers of output ports, including blocking as well as non-blocking switch fabrics;

Support numbers of different skew levels other than 16 and/or different skew step sizes other than those based on VCO/8 and VCO/4; and Support other than two SE input clock signals and one differential input clock signal. For example, a CD chip of the present invention could have four input clock pins to support up to four SE input clock signals and up to two differential input clock signals, including simultaneously receiving one differential clock signal at two of the input clock pins and one or two SE clock signals at the other two input clock pins. As another example, a CD chip of the present invention could have only one input clock pin to support only a single SE input clock signal and no differential input clock signals.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A clock distribution (CD) chip comprising:

first and second input pins adapted to receive first and second input clock signals corresponding to either a differential input clock signal or two single-ended (SE) input clock signals;

input buffer circuitry adapted to receive and handle the input clock signals from the input pins;

clock generation and distribution circuitry adapted to receive a reference clock signal and one or more other clock signals from the input buffer circuitry and programmably generate (i) any of zero, one, or more zero-delay (ZD) clock signals based on the reference clock signal and (ii) any of zero, one, or more non-zero-delay (NZD) clock signals based on the one or more other clock signals, wherein the clock generation and distribution circuitry comprises:

a phase-locked loop (PLL) adapted to generate a PLL clock signal based on the reference clock signal and the feedback clock signal;

a multiplexer (mux) adapted to receive and select between (i) the reference clock signal and (ii) a clock signal derived from the PLL clock signal to provide a mux clock signal;

one or more clock dividers each adapted to divide the mux clock signal by a specified divisor value; and a programmable switch fabric adapted to (i) receive a divided clock signal from each clock divider, a first other clock signal derived from the first input clock signal, and a second other clock signal derived from the second input clock signal and (ii) generate each ZD clock signal and each NZD clock signal in a non-blocking manner, such that each output clock signal may be either a ZD clock signal or an NZD clock signal independent of whether any other output clock signal is a ZD or NZD clock signal;

fanout circuitry adapted to generate an output clock signal for each of the ZD and NZD clock signals;

a plurality of output pins adapted to present the output clock signals;

a feedback pin adapted to receive one of the output clock signals presented at one of the output pins; and feedback buffer circuitry adapted to derive a feedback clock signal from the output clock signal presented at the feedback pin and provide the feedback clock signal to the clock generation and distribution circuitry for use in generating each ZD clock signal.

2. The invention of claim 1, wherein each output clock signal is a single-ended (SE) clock signal.

3. The invention of claim 1, wherein the CD chip is adapted to be configured and programmed such that:

the first and second input clock signals correspond to a differential input clock signal;

the input buffer circuitry converts the differential input clock signal into the reference clock signal for the clock generation and distribution circuitry;

the clock generation and distribution circuitry generates a first ZD clock signal based on the reference clock signal;

the fanout circuitry generates and presents a first SE ZD output clock signal at a first output pin based on the first ZD clock signal;

the first output pin is connected to present the first SE ZD output clock signal at the feedback pin;

the feedback buffer circuitry converts the first SE ZD output clock signal received at the feedback pin into the feedback clock signal corresponding to a simulated differential feedback clock signal, wherein the feedback clock signal is applied to the clock generation and distribution circuitry for use in generating the first ZD clock signal.

4. The invention of claim 3, wherein the clock generation and distribution circuitry comprises a PLL adapted to receive the reference and feedback clock signals and to generate a PLL clock signal, wherein the first SE ZD output clock signal is derived from the PLL clock signal.

5. The invention of claim 3, wherein the feedback buffer circuitry comprises a differential buffer adapted to (i) receive the first SE ZD output clock signal received at the feedback pin and an internally generated reference signal and (ii) generate the feedback clock signal.

6. A clock distribution (CD) chip comprising:

first and second input pins adapted to receive first and second input clock signals corresponding to either a differential input clock signal or two single-ended (SE) input clock signals;

input buffer circuitry adapted to receive and handle the input clock signals from the input pins, wherein the input buffer circuitry comprises:

a differential input buffer adapted to receive and differentially handle the first and second input clock signals;

at least one first-input input buffer adapted to receive and single-endedly handle the first input clock signal;

at least one second-input input buffer adapted to receive and single-endedly handle the second input clock signal;

a first mux adapted to receive clock signals from the differential input buffer and the at least one first-input input buffer;

a second mux adapted to receive clock signals from the differential input buffer and the at least one second-input input buffer; and a third mux adapted to receive clock signals from the first and second muxes, wherein:

the output of the third mux is the reference clock signal;

the output of the first mux is the first other clock signal; and the output of the second mux is the second other clock signal;

clock generation and distribution circuitry adapted to receive a reference clock signal and one or more other clock signals from the input buffer circuitry and programmably generate (i) any of zero, one, or more zero-delay (ZD) clock signals based on the reference clock signal and (ii) any of zero, one, or more non-zero-delay (NZD) clock signals based on the one or more other clock signals;

fanout circuitry adapted to generate an output clock signal for each of the ZD and NZD clock signals;

a plurality of output pins adapted to present the output clock signals;

a feedback pin adapted to receive one of the output clock signals presented at one of the output pins; and feedback buffer circuitry adapted to derive a feedback clock signal from the output clock signal presented at the feedback pin and provide the feedback clock signal to the clock generation and distribution circuitry for use in generating each ZD clock signal.

7. The invention of claim 6, wherein:
the at least one first-input input buffer comprises a plurality of first-input input buffers, each first-input input buffer adapted to handle a different set of one or more signaling standards for the first input clock signal;
the at least one second-input input buffer comprises a plurality of second-input input buffers, each second-input input buffer adapted to handle a different set of one or more signaling standards for the second input clock signal;
the first mux receives clock signals from the differential input buffer and each first-input input buffer; and
the second mux receives clock signals from the differential input buffer and each second-input input buffer.

8. The invention of claim 7, wherein:
the signaling standards supported by the plurality of first-input input buffers correspond to two or more different voltage amplitudes; and
the signaling standards supported by the plurality of second-input input buffers correspond to two or more different voltage amplitudes.

9. A clock distribution (CD) chip comprising:
first and second input pins adapted to receive first and second input clock signals corresponding to either a differential input clock signal or two single-ended (SE) input clock signals;
input buffer circuitry adapted to receive and handle the input clock signals from the input pins;
clock generation and distribution circuitry adapted to receive a reference clock signal and one or more other clock signals from the input buffer circuitry and programmably generate (i) any of zero, one, or more zero-delay (ZD) clock signals based on the reference clock signal and (ii) any of zero, one, or more non-zero-delay (NZD) clock signals based on the one or more other clock signals;
fanout circuitry adapted to generate an output clock signal for each of the ZD and NZD clock signals;
a plurality of output pins adapted to present the output clock signals;
a feedback pin adapted to receive one of the output clock signals presented at one of the output pins; and
feedback buffer circuitry adapted to derive a feedback clock signal from the output clock signal presented at the feedback pin and provide the feedback clock signal to the clock generation and distribution circuitry for use in generating each ZD clock signal,
wherein:
the CD chip further comprises a skew manager; and
the fanout circuitry comprises, for each output clock signal:
a skew controller adapted to apply an amount of skew specified by the skew manager to the corresponding output clock signal; and
an output drive buffer adapted to control slew rate of the corresponding output clock signal.

10. The invention of claim 9, wherein the skew manager is adapted to select one of a plurality of different skew step sizes for each skew controller.

11. The invention of claim 9, wherein the skew manager is adapted to individually control the amount of slew applied by each skew controller.

12. The invention of claim 9, wherein each skew controller is adapted to apply the corresponding specified amount of skew only if the corresponding output clock signal is a ZD output clock signal such that the skew controller generates a non-skewed output clock signal if the corresponding output clock signal is an NZD output clock signal.

13. A clock distribution (CD) chip comprising:
first and second input pins adapted to receive first and second input clock signals corresponding to either a differential input clock signal or two single-ended (SE) input clock signals;
input buffer circuitry adapted to receive and handle the input clock signals from the input pins;
clock generation and distribution circuitry adapted to receive a reference clock signal and one or more other clock signals from the input buffer circuitry and programmably generate (i) any of zero, one, or more zero-delay (ZD) clock signals based on the reference clock signal and (ii) any of zero, one, or more non-zero-delay (NZD) clock signals based on the one or more other clock signals;
fanout circuitry adapted to generate an output clock signal for each of the ZD and NZD clock signals;
a plurality of output pins adapted to present the output clock signals;
a feedback pin adapted to receive one of the output clock signals presented at one of the output pins; and
feedback buffer circuitry adapted to derive a feedback clock signal from the output clock signal presented at the feedback pin and provide the feedback clock signal to the clock generation and distribution circuitry for use in generating each ZD clock signal,
wherein the feedback buffer circuitry comprises:
a plurality of feedback buffers, each adapted to receive the output clock signal presented at the feedback pin; and
a feedback multiplexer (mux) adapted to receive a clock signal from each feedback buffer and to provide the feedback clock signal to the clock generation and distribution circuitry.

14. The invention of claim 13, wherein each feedback buffer is adapted to handle a different set of one or more signaling standards.

15. The invention of claim 13, wherein:
one of the feedback buffers is a differential buffer adapted to receive (i) a SE ZD output clock signal presented at the feedback pin and (ii) an internally generated reference signal; and
the feedback mux is adapted to select an output of the differential buffer as the feedback clock signal if the first and second input signals corresponds to a differential input signal, wherein:
the output of the differential buffer corresponds to a simulated differential feedback clock signal; and
the feedback clock signal is applied to the clock generation and distribution circuitry for use in generating the SE ZD output clock signal.

16. A clock distribution (CD) chip comprising:
first and second input pins adapted to receive first and second input clock signals corresponding to either a differential input clock signal or two single-ended (SE) input clock signals;
input buffer circuitry adapted to receive and handle the input clock signals from the input pins;
clock generation and distribution circuitry adapted to receive a reference clock signal and one or more other clock signals from the input buffer circuitry and programmably generate (i) any of zero, one, or more zero-delay (ZD) clock signals based on the reference clock signal and (ii) any of zero, one, or more non-zero-delay (NZD) clock signals based on the one or more other clock signals;

fanout circuitry adapted to generate an output clock signal for each of the ZD and NZD clock signals;

a plurality of output pins adapted to present the output clock signals;

a feedback pin adapted to receive one of the output clock signals presented at one of the output pins; and feedback buffer circuitry adapted to derive a feedback clock signal from the output clock signal presented at the feedback pin and provide the feedback clock signal to the clock generation and distribution circuitry for use in generating each ZD clock signal, wherein CD chip is adapted to simultaneously generate and present (1) a first ZD output clock signal at a first output pin and (2) a first NZD output clock signal at a second output pin.

17. The invention of claim 16, wherein the CD chip is adapted to be programmed such that:

the first ZD output clock signal is derived from any of (1) only the first input clock signal, (2) only the second input clock signal, and (3) both the first and second input clock signals; and the first NZD output clock signal can be simultaneously derived from any of (1) only the first input clock signal, (2) only the second input clock signal, and (3) both the first and second input clock signals.

18. The invention of claim 16, wherein the CD chip is adapted to be programmed such that the first ZD output clock signal is derived from any of (1) only the first input clock signal, (2) only the second input clock signal, and (3) both the first and second input clock signals;

the first NZD output clock signal can be simultaneously derived from any of (1) only the first input clock signal, (2) only the second input clock signal, and (3) both the first and second input clock signals; and a second NZD output clock signal can be simultaneously derived from any of (1) only the first input clock signal, (2) only the second input clock signal, and (3) both the first and second input clock signals.

19. A clock distribution (CD) chip comprising:

first and second input pins adapted to receive first and second input clock signals corresponding to either a differential input clock signal or two single-ended (SE) input clock signals;

input buffer circuitry adapted to receive and handle the input clock signals from the input pins;

clock generation and distribution circuitry adapted to receive a reference clock signal and one or more other clock signals from the input buffer circuitry and programmably generate (i) any of zero, one, or more zero-delay (ZD) clock signals based on the reference clock signal and (ii) any of zero, one, or more non-zero-delay (NZD) clock signals based on the one or more other clock signals;

fanout circuitry adapted to generate an output clock signal for each of the ZD and NZD clock signals;

a plurality of output pins adapted to present the output clock signals;

a feedback pin adapted to receive one of the output clock signals presented at one of the output pins; and feedback buffer circuitry adapted to derive a feedback clock signal from the output clock signal presented at the feedback pin and provide the feedback clock signal to the clock generation and distribution circuitry for use in generating each ZD clock signal, wherein:

the CD chip is adapted to be programmed such that a first output pin presents any of (1) a ZD output clock signal and an NZD output clock signal; and the CD chip is adapted to be programmed such that each output pin presents any of (1) a ZD output clock signal and an NZD output clock signal independent of the output clock signal presented at any other output pin.

20. A clock distribution (CD) chip comprising:

first and second input pins adapted to receive first and second input clock signals corresponding to a differential input clock signal;

input buffer circuitry adapted to convert the differential input clock signal into a reference clock signal;

clock generation, distribution, and fanout circuitry adapted to generate a single-ended (SE) zero-delay (ZD) output clock signal based on the reference clock signal;

an output pin adapted to present the SE ZD output clock signal;

a feedback pin adapted to receive the SE ZD output clock signal from the output pin;

feedback buffer circuitry adapted to convert the SE ZD output clock signal received at the feedback pin into a feedback clock signal corresponding to a simulated differential feedback clock signal, wherein the feedback clock signal is applied to the clock generation, distribution, and fanout circuitry for use in generating the SE ZD output clock signal, wherein the feedback buffer circuitry comprises a differential buffer adapted to (i) receive the SE ZD output clock signal received at the feedback pin and an internally generated reference signal and (ii) generate the feedback clock signal.

21. The invention of claim 20, wherein the clock generation, distribution, and fanout circuitry comprises a phase-locked loop (PLL) adapted to receive the reference and feedback clock signals and to generate a PLL clock signal, wherein the SE ZD output clock signal is derived from the PLL clock signal.

* * * * *

UNITED STATES PATENT AND TRADEMARK OFFICE
CERTIFICATE OF CORRECTION

PATENT NO.      : 7,657,773 B1
APPLICATION NO. : 11/425881
DATED           : February 2, 2010
INVENTOR(S)     : Chandra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Thirtieth Day of November, 2010

David J. Kappos
*Director of the United States Patent and Trademark Office*